US008368583B1

(12) United States Patent
Piesinger

(10) Patent No.: US 8,368,583 B1
(45) Date of Patent: Feb. 5, 2013

(54) AIRCRAFT BIRD STRIKE AVOIDANCE METHOD AND APPARATUS USING AXIAL BEAM ANTENNAS

(76) Inventor: Gregory Hubert Piesinger, Cave Creek, AZ (US)

( * ) Notice: Subject to any disclaimer, the term of this patent is extended or adjusted under 35 U.S.C. 154(b) by 337 days.

(21) Appl. No.: 12/802,904

(22) Filed: Jun. 16, 2010

Related U.S. Application Data

(60) Provisional application No. 61/268,955, filed on Jun. 18, 2009.

(51) Int. Cl.
*G01S 13/00* (2006.01)
(52) U.S. Cl. ............................................. 342/29; 342/63
(58) Field of Classification Search ............... 342/29–32, 342/36–40
See application file for complete search history.

(56) References Cited

U.S. PATENT DOCUMENTS

| | | | | |
|---|---|---|---|---|
| 2,863,146 A * | 12/1958 | Ruze | ............................. | 343/770 |
| 4,317,119 A * | 2/1982 | Alvarez | ........................ | 342/455 |
| 5,150,336 A * | 9/1992 | Sullivan et al. | ............... | 367/103 |
| 5,359,920 A * | 11/1994 | Muirhead et al. | ............ | 89/41.07 |
| 5,581,250 A * | 12/1996 | Khvilivitzky | ................. | 340/961 |
| 5,737,077 A * | 4/1998 | Lee et al. | ........................ | 356/317 |
| 5,923,302 A * | 7/1999 | Waterman et al. | ............ | 343/846 |
| 6,154,174 A * | 11/2000 | Snider et al. | ................... | 342/371 |
| 2003/0164805 A1 * | 9/2003 | Strickland | ..................... | 343/895 |
| 2004/0178943 A1 * | 9/2004 | Niv | .................... | 342/29 |
| 2005/0187677 A1 * | 8/2005 | Walker | ........................... | 701/16 |
| 2006/0287829 A1 * | 12/2006 | Pashko-Paschenko | ....... | 701/301 |
| 2007/0252748 A1 * | 11/2007 | Rees et al. | ....................... | 342/29 |
| 2008/0021647 A1 * | 1/2008 | Daveze et al. | ................ | 701/301 |
| 2009/0027253 A1 * | 1/2009 | van Tooren et al. | ............ | 342/29 |
| 2009/0090817 A1 * | 4/2009 | Monka | ........................ | 244/76 R |
| 2009/0174591 A1 * | 7/2009 | Cornic et al. | .................... | 342/29 |

* cited by examiner

*Primary Examiner* — Timothy A Brainard

(57) ABSTRACT

An aircraft avian radar is implemented using multiple axial beam antennas mounted on an aircraft. Target range is determined by radar range. Target azimuth and elevation position is determined by triangulation. An end-fire array antenna composed of a series of monopole antenna elements enclosed inside a long thin protective cover fashioned in the form of a stall fence is mounted on the wings, tail, or fuselage to produce a low drag axial beam antenna pattern directed ahead of the aircraft. Other axial beam antenna choices include helical, pyramidal horn, and conical horn antennas mounted on or inside various forward facing surfaces of the aircraft.

20 Claims, 9 Drawing Sheets

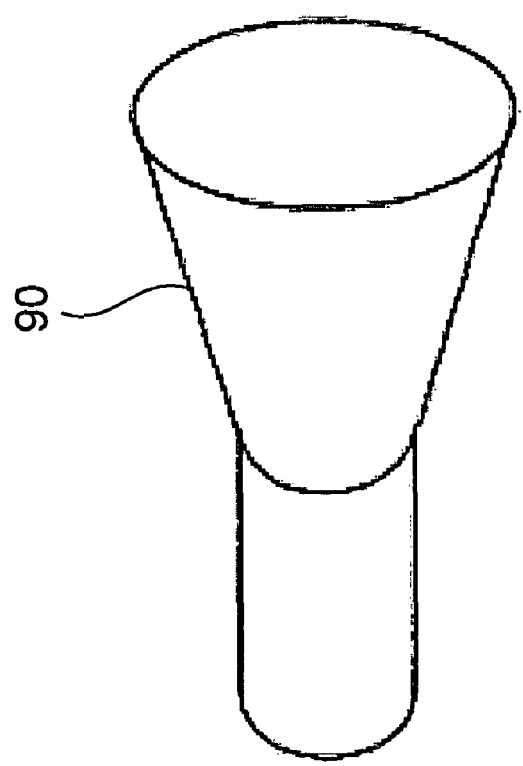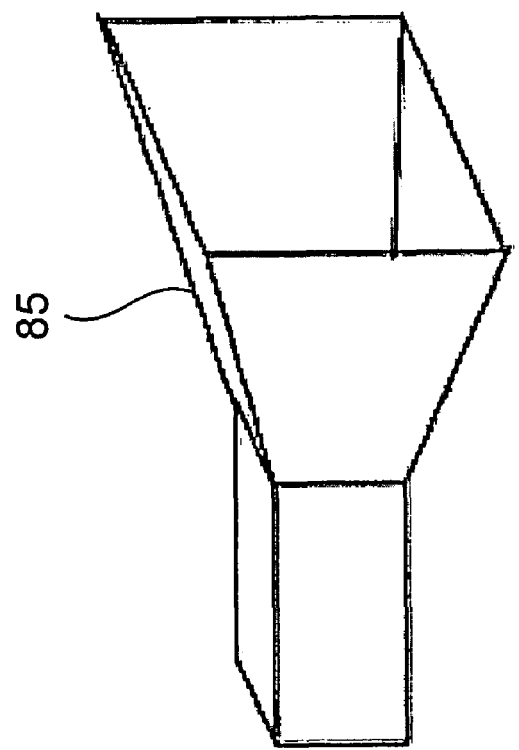
FIG. 6

AIRCRAFT BIRD STRIKE AVOIDANCE METHOD AND APPARATUS USING AXIAL BEAM ANTENNAS

RELATED INVENTION

The present invention claims priority under 35 U.S.C. §119 (e) to: "Aircraft Bird Strike Avoidance Method and apparatus using Axial beam Antennas" Provisional U.S. Patent Application Ser. No. 61/268,955, filed 18 Jun. 2009 which is incorporated by reference herein.

TECHNICAL FIELD OF THE INVENTION

The present invention relates to the detection and avoidance of imminent aircraft collisions with birds or other airborne hazards such as other aircraft.

BACKGROUND OF THE INVENTION

Aviation experts say bird-plane collisions happen daily. Nearly 200 people have been killed or injured since 1990 in accidents involving aircraft and wildlife. It is estimated that bird strikes cost military and commercial aviation over $2 billion each year due to damage and other costs. Most birds fly below 5,000 ft. However, bird strikes have occurred at 17,000 ft. and a few sightings have been made above 20,000 ft. In general, birds fly higher at night and during the spring and fall migration periods. They also fly higher in the presence of complete cloud cover.

Airports take a variety of measures to reduce bird populations near major airports. In a few cases, avian radars are used to detect flying birds near aircraft approach and departure paths. However, outside of these few major airports, no bird detection devices are currently available other than the pilot's see-and-avoid procedures.

It may be possible to equip an aircraft with a specialized high resolution scanning radar to detect and display the presence of birds. However, such a radar would be expensive and it would be difficult to find antenna installation space even on the largest aircraft.

Accordingly, there is a need for small low cost aircraft based detection equipment that would alert the pilot to the possibility of an imminent collision with a bird or other airborne hazard.

SUMMARY OF THE INVENTION

Previously, aircraft avian radars were described in U.S. patent application Ser. No. 12/657,318 "Aircraft bird strike avoidance method and apparatus" and U.S. patent application Ser. No. 12/798,154 "Aircraft bird strike avoidance method and apparatus using transponder". These inventions described multiple implementations of on-aircraft avian radars and are incorporated herein by reference. The present invention describes the use of axial beam antennas in the previously referenced inventions and in additional on-aircraft avian radar implementations.

The previously referenced patent applications described on-aircraft bird strike collision avoidance radars that alert the pilot to take evasive action to avoid colliding with birds or other imminent collision hazards such as other aircraft. Briefly, to achieve the desired object of those inventions, non-scanning narrow beam antennas were used to detect the presence of hazards in a short range altitude slice ahead of the aircraft. Target amplitude, range, and Doppler tracking versus time were used to qualify the collision threat. Avoidance was based on a quick minor altitude change by the pilot or auto pilot to exit the imminent bird or small aircraft hazard altitude window.

Patent application Ser. No. 12/657,318 described the use of aircraft mounted long narrow array antennas whose beam was normal to the plane of the array. These antennas were mounted on forward facing surfaces of the aircraft such as the leading edge of the wings or vertical tail. Unfortunately, these surfaces can be covered with deicing boots thus making it a difficult position to mount long aperture antennas.

Since usable forward surfaces of an aircraft are limited, patent application Ser. No. 12/798,154 described the use of rectangular horn, circular horn, and helix antennas. These antennas have a forward axial response, high front to back isolation, and can be mounted inside the wings or tail. Thus, these antennas require much less aircraft wing and tail leading edge surface than the long narrow array antennas mentioned in patent application Ser. No. 12/657,318.

The present invention describes another axial beam antenna that has a very small forward facing cross section and does not require mounting on aircraft leading edge surfaces.

In the present invention, an end-fire monopole array is implemented in the form of a stall fence. Stall fences are used on a variety of aircraft to improve low speed performance.

To achieve the desired avian radar performance, one or more stall fence antennas are implemented. In other embodiments, one or more helical antennas are implemented, one or more horn antennas are implemented, or some combination of multiple aforementioned antennas are arranged on the aircraft to determine radar target positions by triangulation.

Other objects and advantages of the present invention will become obvious as the preferred embodiments are described and discussed below.

BRIEF DESCRIPTION OF THE DRAWINGS

FIG. 6 illustrates a pyramidal horn and conical horn antenna which have axial beam patterns similar to the antennas illustrated in FIG. 2 and FIG. 4.

DETAILED DESCRIPTION OF THE PREFERRED EMBODIMENTS

Figure 1:
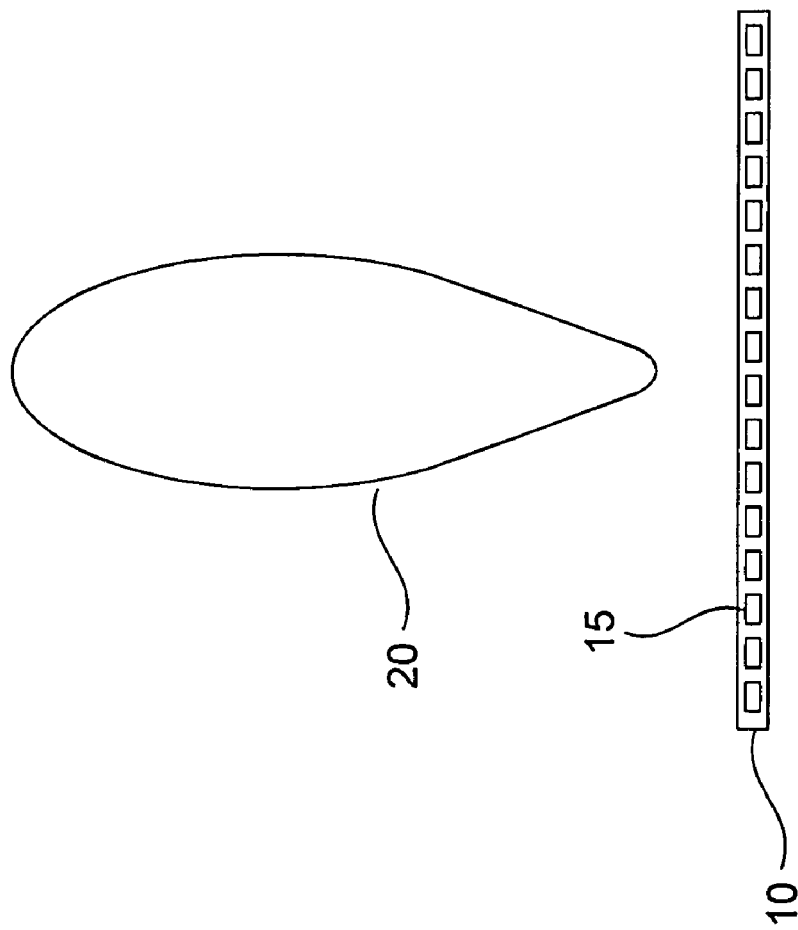
FIG. 1 illustrates a broadside antenna pattern from a long narrow slotted array antenna composed of a series of array aperture elements.

FIG. 1 illustrates a long narrow slotted array antenna 10 composed of array aperture elements 15 that produces broadside antenna pattern 20. In the previously referenced patent applications, the mounting of this antenna was illustrated on the leading edge of the wings, tail, and on the top forward area of the fuselage.

Figure 2:
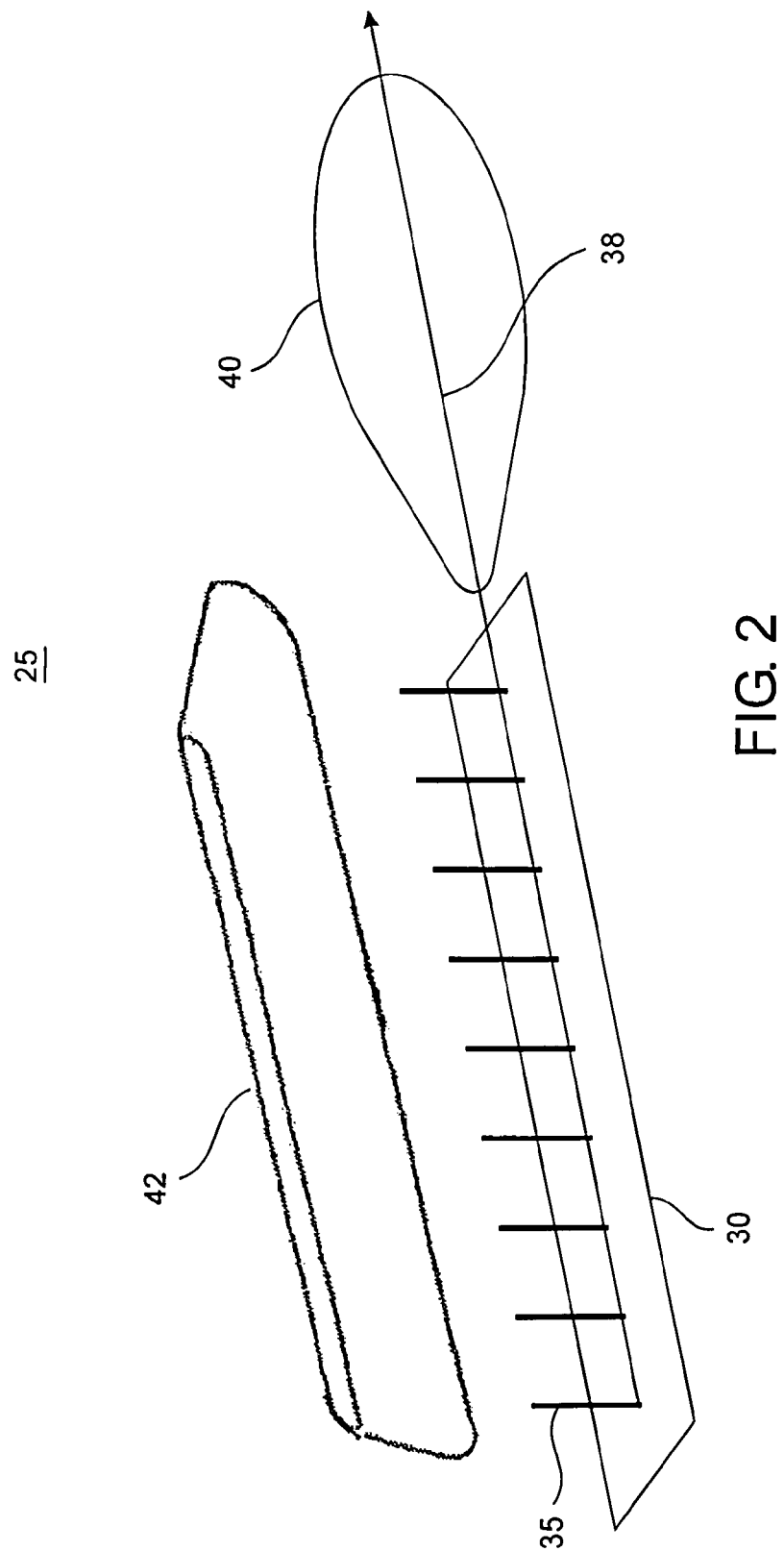
FIG. 2 illustrates an axial antenna pattern from an end-fire array antenna composed of a series of monopole antenna elements enclosed inside a protective cover.
Figure 3:
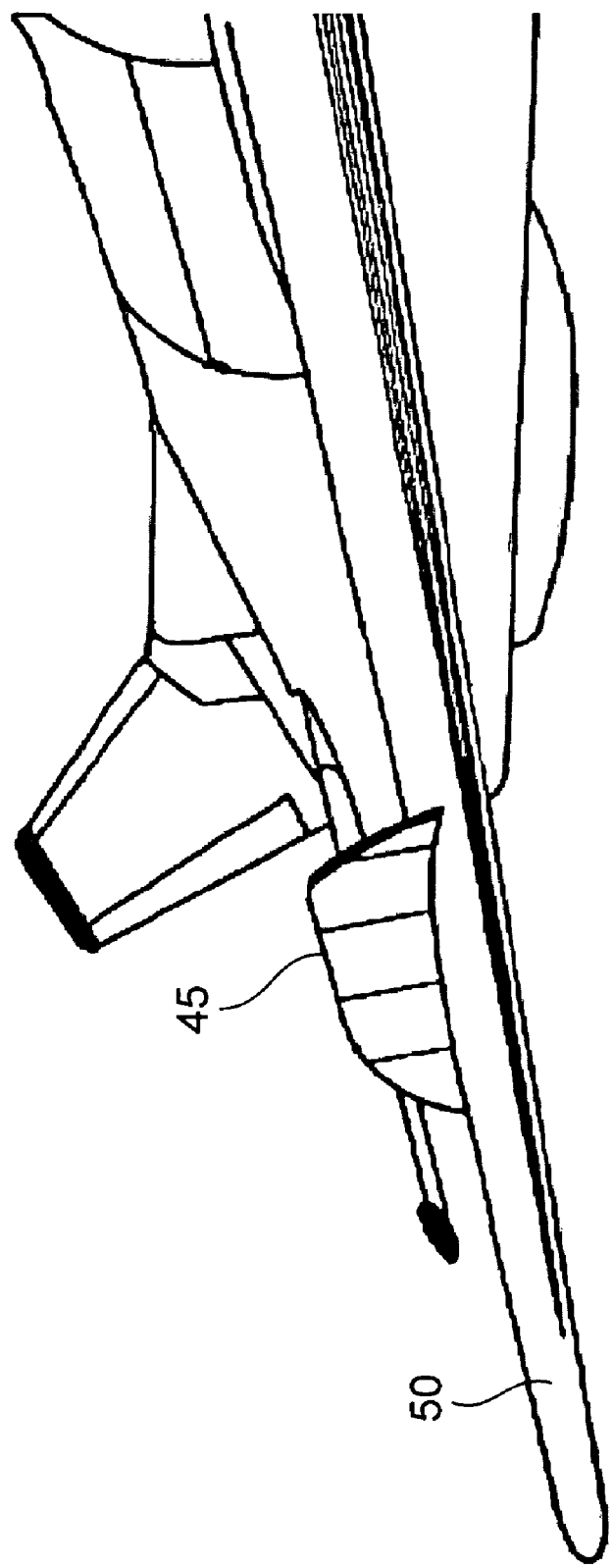
FIG. 3 illustrates a typical stall fence mounted on the wing of an aircraft.

An end-fire array 30 of monopole antenna elements 35 can be constructed as illustrated in FIG. 2. As is well known by those skilled in the art, maximum radiation occurs in the axial direction 38 producing antenna pattern 40. In the current invention, this end-fire array is enclosed in housing 42 and mounted on an aircraft surface similar to the way stall fence 45 is mounted on wing 50 in FIG. 3. Stall fence antenna 25 allows a narrow antenna beamwidth to be obtained in the forward direction without having to mount a long narrow antenna along a forward facing surface of the aircraft.

The primary feature of stall fence antenna 25 is that forward directivity can be obtained using a low drag blade like antenna without having to mount it on a forward surface of the aircraft. Stall fence antenna 25 can be mounted on any aircraft surface normal to the direction of flight. Possible locations include the top or bottom wing surface, any fuselage surface, and either the side or top surfaces of the vertical tail.

Gain and directivity of stall fence antenna 25 can be varied over a wide range simply by selecting the number of antenna elements 35 and their amplitude and phase weighting. Amplitude and phase weighting can also be varied to correct for any antenna pattern effects due to mounting stall fence antenna 25 on contoured aircraft surfaces.

Stall fences 45 are still used on modern aircraft and have a positive effect on aircraft flight characteristics. However, they can be used even when not required for flight performance enhancements due to their thin cross section and small frontal area. This characteristic allows multiple stall fence antennas 25 to be placed at almost any desired location required to optimize the performance of avian radar 140 illustrated in FIG. 8.

Figure 4:
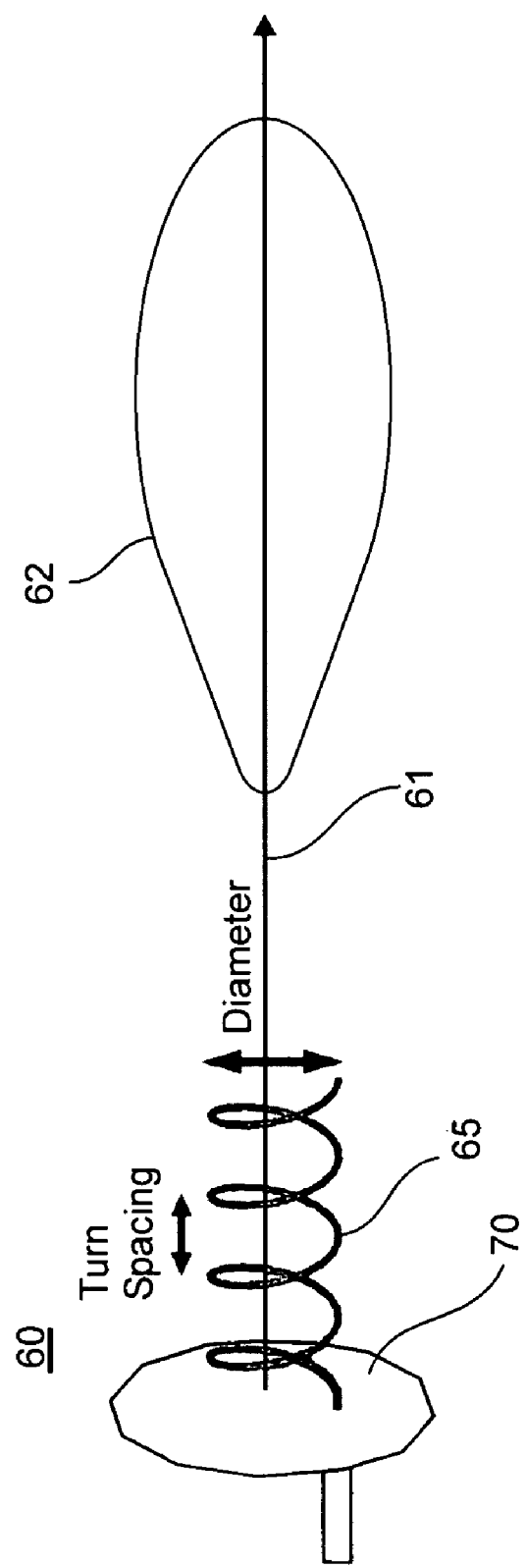
FIG. 4 illustrates an axial antenna pattern from a helical antenna.
Figure 5:
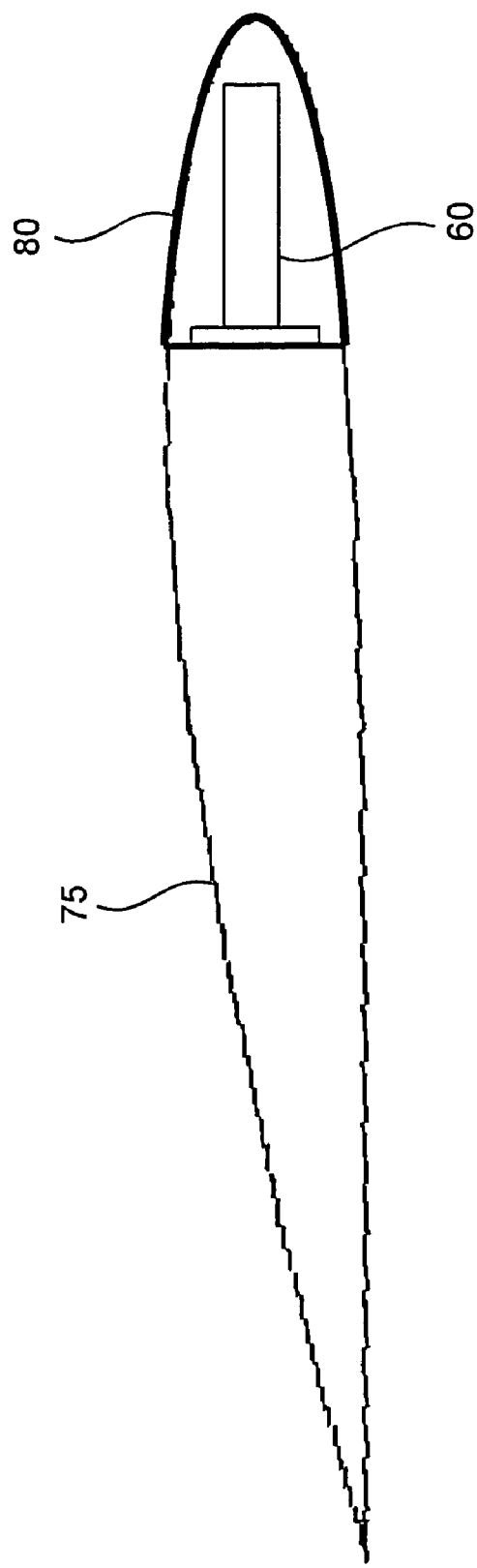
FIG. 5 illustrates the helical antenna of FIG. 4 mounted inside a wing behind a radome.

Another end-fire antenna choice is helical antenna 60 operating in axial mode with beam pattern 62 directed along axial direction 61 as illustrated in FIG. 4. A helical antenna is composed of conducting wire 65 wound in the form of a helix. In most cases, helical antennas are mounted over ground plane 70. Helical antenna 60 can be mounted inside wing 75 and a small portion of the wing leading edge in front of helical antenna 60 covered by radome 80 as illustrated in FIG. 5. Helical antenna 60 could also be similarly mounted in the aircraft vertical tail.

Two other axial beam antennas are pyramidal horn 85 and conical horn 90 illustrated in FIG. 6. Both these horn antennas have axial beam patterns similar to end-fire array antenna pattern 40 illustrated in FIG. 2 and pattern 62 illustrated in FIG. 4. They could also be mounted inside the wings or tail behind a radome.

For some applications, antennas illustrated in the current invention might replace the broadside linear array antennas illustrated in the previously referenced patent applications if their beam patterns are similar enough. However, an optimum aircraft antenna arrangement using the axial beam antennas of the present invention is illustrated in FIG. 7.

Figure 7:
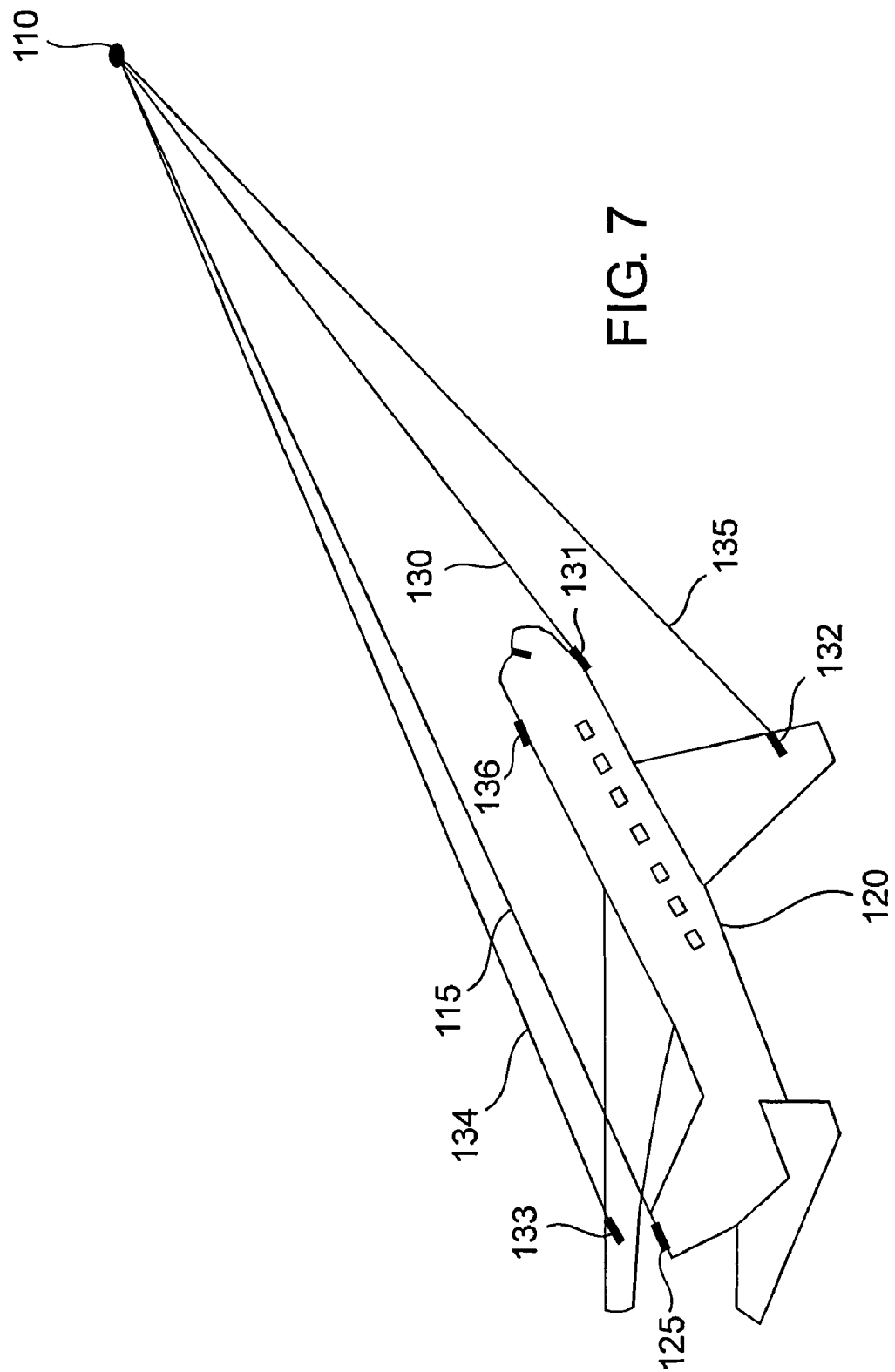
FIG. 7 illustrates the aforementioned antennas mounted on an aircraft and indicates the round trip radar signal paths to a distant target.

FIG. 7 illustrates aircraft 120 equipped with transmitter antenna 125 and receiver antennas 131, 132, and 133. Each antenna in FIG. 7 is an axial beam antenna. Transmitter antenna 125 illuminates target 110 with a radar signal along path 115. Target 110 reflected radar signals are received at antenna 131 along path 130, at antenna 132 along path 135, and at antenna 133 along path 134.

The roundtrip radar signal path length at antenna 131 is equal to the sum of paths 115 and 130. The roundtrip radar signal path length at antenna 132 is equal to the sum of paths 115 and 135. The roundtrip radar signal path length at antenna 133 is equal to the sum of paths 115 and 134. These roundtrip path lengths can be determined by measuring the roundtrip time delay between the transmitted radar signal and the received radar signal at each antenna.

The position of target 110 is uniquely determined by the combination of the three roundtrip path lengths between transmitter antenna 125 and receiver antennas 131, 132, and 133. As is well known by those skilled in the art, determining the position of target 110 with respect to aircraft 120 is simple geometry based on the positions of the transmitter and receiver antennas and the three roundtrip path lengths.

To maximize the calculated position accuracy of target 110, horizontally arranged receiving antennas 132 and 133 should be as far apart as possible. Likewise, vertically arranged transmitter antenna 125 and receiver antenna 131 should also be as far apart as possible. If receiver antenna 131 is moved to position 136, for example, the target position vertical resolution will decrease due to the reduced vertical distance between transmitter antenna 125 and the receiving antenna at position 136.

Although the radar configuration illustrated in FIG. 7 requires more receiver antennas than were described in the previously referenced patent applications, target position can now be accurately determined independent of the antenna beam pattern shapes. As long as the transmitter illuminates the target and the receivers view the target, the target position can be determined with great accuracy.

The ability to quickly and accurately determine target position is an invaluable feature in this on-aircraft avian radar application because radar range is limited. If the pilot knows where the target is with respect to the aircraft, the aircraft can be accurately moved in the correct manner to avoid a bird strike. Accurately knowing the target position also greatly reduces the incidence of false alarms because warnings will only be issued when the probability of an imminent bird strike is high.

Figure 8:
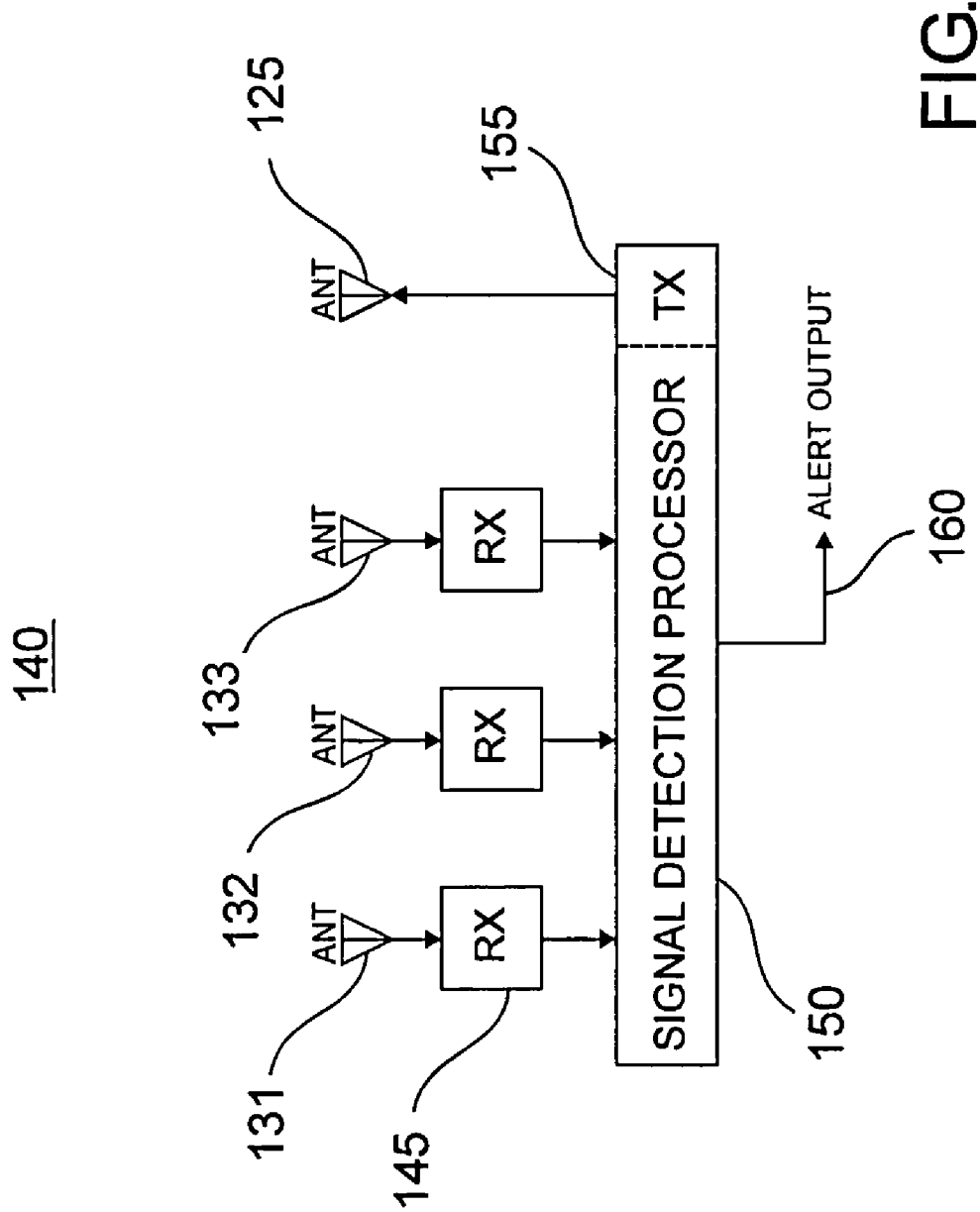
FIG. 8 illustrates a top level block diagram of the avian radar.

A top level block diagram of avian radar 140 is illustrated in FIG. 8. Transmitter 155 transmits a radar signal using axial beam antenna 125. Reflected radar signals from each axial beam antenna 131, 132, and 133 are received using identical receivers 145 and processed in signal detection processor 150. The range and position of detected aircraft hazards are sent to various aircraft aural and visual resources using alert output 160.

Any type of radar signal can be used in the current invention. However, the optimum radar signal is one that provides maximum range resolution since roundtrip radar path delay determines the target position resolution. As was indicated in the previously referenced patent applications, a CW radar using direct sequence pulse compression is an example of an optimum radar and radar signal.

Figure 9:
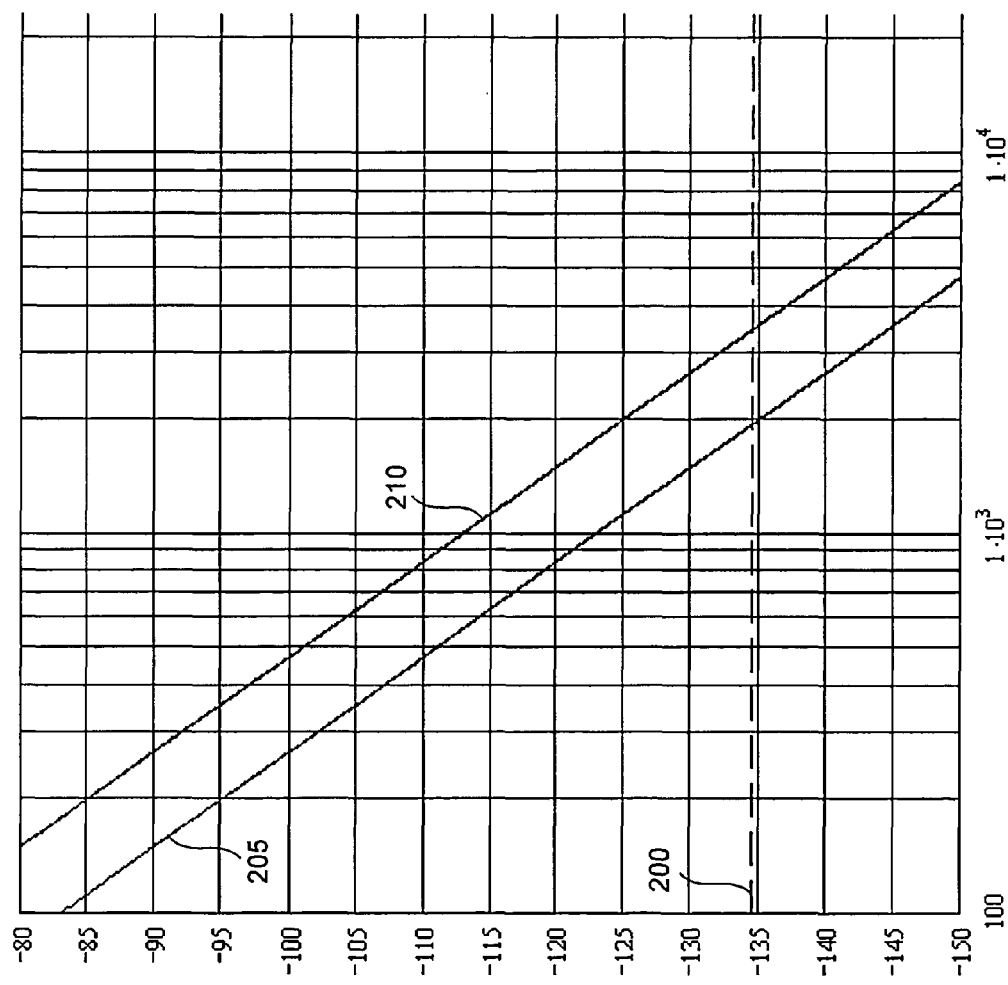
FIG. 9 illustrates the approximate radar range performance obtainable for a typical radar implementation when the avian target is either a single pigeon or flock of pigeons.

As is well known by those skilled in the art of radar design, multiple tradeoffs can be made between the various radar parameters such as transmitter power, frequency, antenna size, beamwidth, processing gain, etc. The approximate performance obtainable using a 10 watt S-band CW direct sequence pulse compression radar, 15 dB gain antennas, 100 nanosecond chip period, 1000 chip code period, and 10 millisecond integration period is illustrated in FIG. 9. FIG. 9 plots the received power level in dBm versus range in meters for single pigeon 205 and flock 210 with respect to minimum discernable signal (MDS) level 200. Note that a single pigeon can be detected out to a range of 2 kilometers which is approximately 15 seconds at 250 knots. Assuming the target is tracked for 5 seconds to qualify its threat, a pilot would receive 10 seconds of imminent pigeon strike warning.

Another advantage of the current invention is the use of either a small forward profile exposed antenna with low drag as was illustrated in FIG. 2 or a no-drag enclosed antenna as was illustrated in FIG. 5. For high altitude business and transport category aircraft, bird detection is only required during the climb and descent flight regimes because bird strikes are not an issue at high cruising altitudes. Since the aircraft spends most of its time in cruise, low drag is important for good fuel efficiency.

Although the preferred embodiments of the invention have been illustrated and described in detail, it will be readily apparent to those skilled in the art that various modifications may be made therein without departing from the spirit of the invention. For example, it may be possible to use a wing spar or wing support member as the helical antenna ground plane by mounting the helical wire directly to the spar or support member. The helical antenna could also protrude through the wing leading edge or even be mounted on its outside surface.

The positions of transmit antenna 125 and receive antenna 131 could be interchanged so as to place the transmitter closer to the avionics bay.

In the simplest implementation, a single axial beam receiving antenna can be used and a collision threat issued if any radar target is detected at short range ahead of the aircraft. In many flight regimes, any radar target detected ahead of the aircraft is a potential collision hazard. Many other simple modifications are also possible without departing from the spirit of the invention.

What is claimed is:

1. A method for detecting and avoiding an aircraft collision with birds or other airborne hazards, said method comprising:
    providing a transmitter non-scanning axial beam antenna on said aircraft;
    providing at least one receiver non-scanning axial beam antenna on said aircraft;
    illuminating a surveillance volume ahead of said aircraft with a radar signal;
    receiving reflections of said radar signal from radar targets in said surveillance volume;
    alerting the pilot of a collision threat with said radar targets; and
    maneuvering said aircraft to avoid colliding with said radar targets.

2. A method as claimed in claim 1 wherein said axial beam antenna is an end-fire monopole array antenna.

3. A method as claimed in claim 2 wherein said end-fire monopole array antenna is implemented in the form of a stall fence antenna.

4. A method as claimed in claim 3 wherein said stall fence antenna is mounted on the top or bottom wing surface of said aircraft.

5. A method as claimed in claim 3 wherein said stall fence antenna is mounted on the fuselage of said aircraft.

6. A method as claimed in claim 3 wherein said stall fence antenna is mounted on the vertical tail surface of said aircraft.

7. A method as claimed in claim 1 wherein said axial beam antenna is a horn antenna.

8. A method as claimed in claim 7 wherein said horn antenna is mounted inside the wings or tail of said aircraft behind a radome.

9. A method as claimed in claim 1 wherein said axial beam antenna is a helical antenna.

10. A method as claimed in claim 9 wherein said helical antenna is mounted inside or outside the wings or tail leading edge surfaces of said aircraft.

11. A method as claimed in claim 1 wherein said radar signal is a continuous wave pseudo random noise coded pulse compression waveform.

12. A method as claimed in claim 1 further including separating said non-scanning axial beam antennas on said aircraft horizontally, vertically, or both horizontally and vertically and determining said collision threat of said radar targets by triangulation.

13. A method for detecting birds or other airborne hazard ahead of an aircraft in flight and avoiding collision with said birds or said airborne hazard, said method comprising:
    providing a non-scanning first axial beam antenna on said aircraft, said first axial beam antenna functioning as a radar transmitter antenna;
    providing a non-scanning second axial beam antenna on said aircraft, said second axial beam antenna functioning as a radar receiver antenna;
    mounting said first axial beam antenna and said second axial beam antenna on said aircraft such that their maximum directivities are pointed in the forward flight path direction of said aircraft and their antenna beam patterns overlap;
    illuminating at least the overlapping surveillance volume of said first axial beam antenna and said second axial beam antenna with a radar signal;
    receiving reflections of said radar signal from radar targets within antenna pattern of said second axial beam antenna;
    declaring said radar targets a said airborne hazard whenever said reflections are received from said second axial beam antenna;
    alerting the pilot of said aircraft of said airborne hazard; and
    maneuvering said aircraft to avoid said airborne hazard.

14. An apparatus for detecting and avoiding an aircraft collision with birds or other airborne hazard, said apparatus comprising:
    one or more non-scanning axial beam antenna mounted on said aircraft and configured to observe a surveillance volume ahead of said aircraft;
    a transmitter coupled to a said axial beam antenna and configured to illuminate said surveillance volume with a radar signal;
    receivers coupled to one or more said axial beam antenna and configured to receive reflections of said radar signal from radar targets;
    a signal detection processor coupled to said one or more receivers and configured to detect and process said reflections from said radar targets to determine the collision threat between said aircraft and said radar targets; and
    means for communicating said collision threat to said aircraft pilot,
    whereby said pilot can maneuver said aircraft to avoid a collision with said airborne hazard.

15. An apparatus as in claim 14 wherein one or more said axial beam antenna is an end-fire monopole array antenna.

16. An apparatus as in claim 15 wherein said end-fire monopole array antenna comprises a plurality of vertical monopole antenna elements arranged in an array and enclosed in a long thin radome housing fashioned in the form of a stall fence to form a stall fence antenna.

17. An apparatus as in claim 16 wherein said stall fence antenna is mounted on the top or bottom wing surface of said aircraft.

18. An apparatus as in claim 14 wherein locations of said axial beam antenna on said aircraft are separated both horizontally and vertically.

19. An apparatus as in claim 18 wherein said radar target location is determined by triangulation.

20. An apparatus as in claim 19 wherein said collision threat is determined by said radar target location.

\* \* \* \* \*